(12) United States Patent
Navratil

(10) Patent No.: US 11,626,814 B2
(45) Date of Patent: Apr. 11, 2023

(54) LINEAR ADJUSTMENT DEVICE

(71) Applicant: PHYSIK INSTRUMENTE (PI) GMBH & CO. KG, Karlsruhe (DE)

(72) Inventor: Tomas Navratil, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 257 days.

(21) Appl. No.: 17/254,782

(22) PCT Filed: Jun. 18, 2019

(86) PCT No.: PCT/DE2019/100559
§ 371 (c)(1),
(2) Date: Dec. 21, 2020

(87) PCT Pub. No.: WO2019/242814
PCT Pub. Date: Dec. 26, 2019

(65) Prior Publication Data
US 2021/0265923 A1    Aug. 26, 2021

(30) Foreign Application Priority Data
Jun. 22, 2018   (DE) ..................... 10 2018 115 086.5

(51) Int. Cl.
*H02N 2/02* (2006.01)
*G02B 7/00* (2021.01)
(52) U.S. Cl.
CPC ............... *H02N 2/028* (2013.01); *G02B 7/00* (2013.01)
(58) Field of Classification Search
CPC combination set(s) only.
See application file for complete search history.

(56) References Cited

U.S. PATENT DOCUMENTS 4,952,835 A    8/1990   Stahlhuth
5,693,997 A *  12/1997  Griffith .................. H01L 41/096
                                                      310/366

(Continued)

FOREIGN PATENT DOCUMENTS

CN    204906221 U    12/2015
DE      3626507 A1    2/1987

(Continued)

OTHER PUBLICATIONS

English Abstract for DE102005016960 retrieved on Espacenet on May 5, 2022.

(Continued)

*Primary Examiner* — Emily P Pham
(74) *Attorney, Agent, or Firm* — The Juhasz Law Firm

(57) ABSTRACT

The invention relates to an adjustment device (1), comprising at least two linear stages (2, 3), which are arranged next to each other and which are fixedly connected to each other (6) by means of one of the adjustment sections (5) of each of the linear stages such that an adjustment movement of one linear stage can be transferred to the adjacent linear stage, wherein one linear stage is designed to bring about an increase in the distance between the adjustment sections arranged on said linear stage as a result of actuation of the adjustment element and an adjacent linear stage is designed to bring about a decrease in the distance between the adjustment sections arranged on said linear stage as a result of actuation of the adjustment element so that a displacement of the adjustment device can be realized, which displacement corresponds to the sum of the amounts of the changes in the distance between the adjustment sections of the linear stages.

9 Claims, 4 Drawing Sheets

(56) References Cited

U.S. PATENT DOCUMENTS

Figure 1:
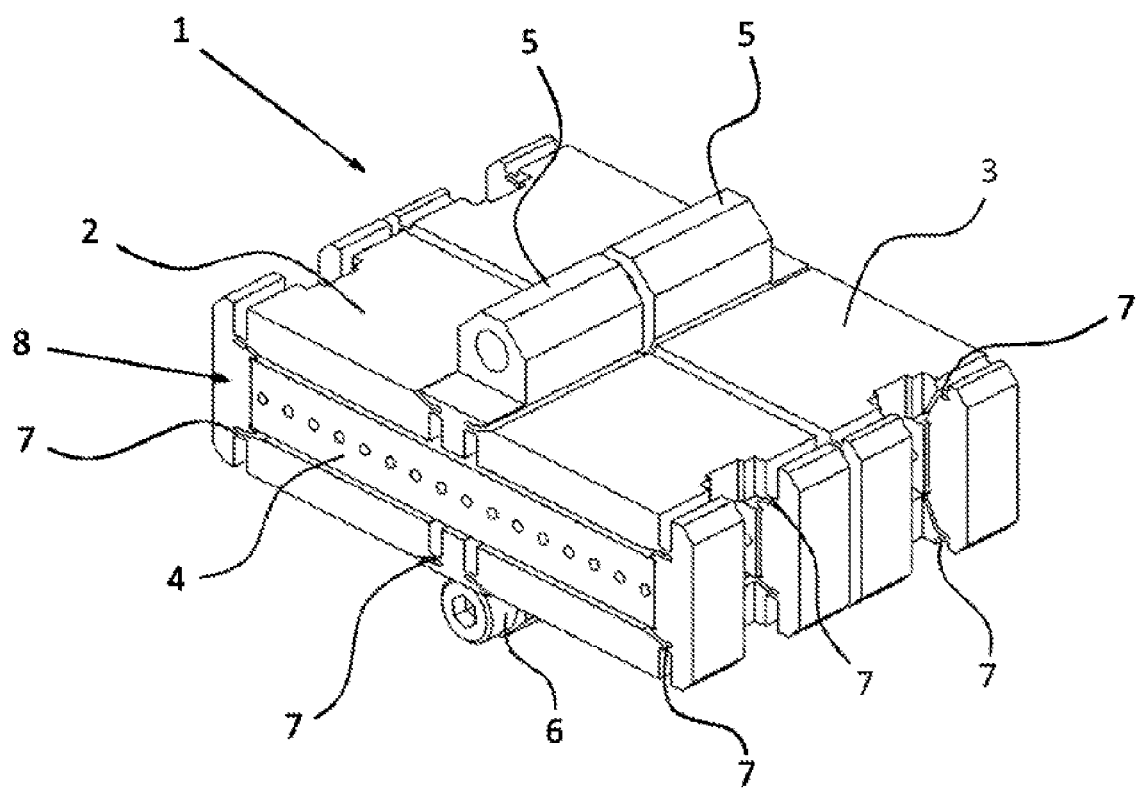

| | | | |
|---|---|---|---|
| 5,729,077 | A | 3/1998 | Newnham et al. |
| 6,140,742 | A | 10/2000 | Kahn |
| 6,246,132 | B1 | 6/2001 | Joshi et al. |
| 6,927,528 | B2 * | 8/2005 | Barillot .................. H02N 2/043 |
| | | | 310/328 |
| 9,523,294 | B2 | 12/2016 | Cho |

FOREIGN PATENT DOCUMENTS

| | | |
|---|---|---|
| DE | 19916277 A1 | 10/2000 |
| DE | 102005016960 A1 | 10/2006 |
| DE | 102016116763 A1 | 3/2018 |
| GB | 2550155 A | 11/2017 |
| RU | 2603353 C1 | 11/2016 |
| WO | 2017/176209 A1 | 10/2017 |

OTHER PUBLICATIONS

English Abstract for DE19916277 retrieved on Espacenet on May 5, 2022.
English Abstract for DE102016116763 retrieved on Espacenet on May 5, 2022.
English Abstract for DE3626507 retrieved on Espacenet on May 5, 2022.
English Abstract for CN204906221 retrieved on Espacenet on May 5, 2022.

* cited by examiner

LINEAR ADJUSTMENT DEVICE

The invention relates to an adjustment device according to claim 1.

From document U.S. Pat. No. 6,465,936 B1, an adjustment device is known in which the displacement limited with respect to an individual linear stage is increased by a serial arrangement or a stack arrangement of individual linear stages.

Document U.S. Pat. No. 5,729,077 also discloses an adjustment device with a serial arrangement of linear stages, each of which are formed of an electroactive ceramic and convex metal sheets arranged thereon.

The main disadvantage of such an adjustment device formed from several linear stages arranged one behind the other is the large amount of space required in the direction of extension of the stack. Such an adjustment device is therefore ruled out for applications where there is only a small structural dimension in a direction available which coincides with the direction of the displacement.

On the contrary, document DE 10 2005 016 960 A1 describes a linear actuator in which between connection elements a plurality of piezoactive elements in series connection are arranged side by side, wherein for a stroke movement of the connection elements or of a connection element individual piezoactive elements are being acted upon such that an expansion movement results, while the piezoactive elements disposed at them are acted upon in such a way that a contraction movement results, so that the stroke of the individual piezoactive elements is multiplied without the need to lengthen the actuator.

Similarly, DE 19916 277 A1 describes a space-saving device for moving an object with at least two separately electrically controllable piezoelectric movement elements and an operative connection between the piezoelectric movement elements in such a way that the resulting changes in length of the piezoelectric movement means can add up to a total length so that the maximum possible length of the movement in one dimension is greater than the maximum possible change in length of a single piezoelectric movement means.

Also, U.S. Pat. No. 6,140,742 discloses telescopically nested piezoelectric movement elements which are nested one into the other and coupled to one another in such a way that the total adjusting movement of the corresponding adjustment device corresponds to the sum of the lengths of the movement elements.

In document WO2017/176209 A1 piezoelectric actuators are arranged in recesses of a connecting element distributed over the circumference of the same, wherein the change in length of the actuators arranged therein act in directions which are directed contrary to each other. By nesting one inside the other multiple times, the travel range of an individual actuator can be multiplied in a space-saving manner.

Documents GB 2550155 A, U.S. Pat. No. 9,523,294 B2, U.S. Pat. No. 4,952,835 and DE 10 2016 116 763 A1 each disclose linear stages that comprise an actuator and a frame element surrounding the actuator, the frame element having a lever transmission device realized via flexure hinges, in order to use it to achieve an increase in the short actuator travel.

Document 6,246,132 B1 shows an adjustment device that works in push-pull mode. In this case, a first actuator unit generates an adjustment movement of an adjustment element coupled to the first actuator unit in a first direction, and a second actuator unit, which is firmly connected to the first actuator unit, generates an adjustment movement of the adjustment element in a second direction which is directed contrary to the first direction.

It is the object of the invention to provide an adjustment device which realizes an enlargement of the displacement by accumulating the displacements of several linear stages and which at the same time allows a compact size in a direction which corresponds to the direction of the displacement of the adjustment device.

This object is achieved by an adjustment device according to claim 1, wherein the subsequent subclaims describe at least useful developments.

The term "essentially" used in the following part of the description in connection with the specification of geometric data such as angles, dimensions, positions, orientations or directions is to be understood as meaning that the corresponding geometric data comprise a deviation of +/−5% compared to the specified geometric date, this deviation being due, for example, to manufacturing or assembly tolerances.

The adjustment device according to the invention comprises at least two adjacently arranged linear stages, each of which comprises at least one adjustment element driving the respective linear adjustor. In each of the linear stages, there are two adjustment sections which are arranged on sides of the adjustment element which are lying contrary to each other. Overall, the adjustment device according to the invention comprises at least four adjustment sections, wherein one adjustment section is used for a stationary arrangement on a higher-level unit. Another adjustment section of the total of at least four adjustment sections is provided for the purpose that an element to be moved by a defined displacement with respect to the higher-level unit is arranged on it in opposite of it.

Adjacent linear stages are firmly connected to one another in each case via one of their adjustment sections, so that an adjustment movement of a linear stage can be transmitted to the adjacent linear stage. In other words, one linear stage is displaced or moved by the other linear stage by a defined displacement.

One of the linear stages is configured to cause an increase in the distance between the adjustment sections arranged on it by actuating the adjustment element, while an adjacent linear stage is designed to reduce the distance between the adjustment sections arranged on it by pressing the adjustment element. The amount of the increase in the distance of the corresponding linear stage corresponds to the displacement of this linear stage; analogously, the amount of the reduction in the distance of the adjacent linear stage corresponds to the displacement of this linear stage. Due to the fixed connection of the linear stages, a displacement of the adjustment device can be realized which corresponds to the sum of the amounts of the distance changes between the adjustment sections of the linear stages or the sum of the displacements of the respective linear stages. By arranging the linear stages next to one another, it is achieved that the extension of the adjustment device in a direction which essentially corresponds to the direction of the displacement of the adjustment device remains comparatively small.

The invention is characterized in that at least one of the linear stages comprises a lever transmission device, and the adjustment element comprises an elongated shape and is inserted into a frame of the linear stage that comprises flexure hinges, wherein the adjustment movements of the linear stages take place in the same direction.

It can be advantageous that the adjustment sections of adjacent linear stages are connected to one another via a coupling element. By this the mechanical coupling or fixed connection of the corresponding adjustment sections is achieved in a particularly easy manner. In particular, a detachable connection between the adjustment sections can thereby also be realized.

It can also be advantageous that the adjustment element is an electromechanical element, which preferably comprises piezoelectric material. Piezoelectric adjustment elements, also called piezo actors, comprise a particularly high rigidity and allow adjustment movements with a very high resolution.

It can be advantageous that the structure of the frames of adjacent linear stages differs from one another. The different structure or the different construction of the frames of adjacent linear stages makes it possible, when using substantially the same adjustment elements with identical length change behavior, to cause different relative movements of the adjustment sections to one another in the various linear stages.

It can also be advantageous that the two adjustment sections of a linear stage are integrally formed with the frame. This allows an embodiment of the linear stage which is particularly compact and easy to assemble.

Furthermore, it can be advantageous that the direction of the adjusting movement of an actuating section is arranged essentially perpendicular to the direction of extension of the adjustment element. As a result, an adjustment device can be realized even with a large length of the adjustment element such that the extension of the adjustment device in a direction, which coincides with the direction of the adjustment movement of the adjustment section, is comparatively small, whereby a compact structural dimension can be achieved in the corresponding direction.

The invention also relates to a positioning device for optical elements with an adjustment device described above.

Advantages and expediencies of the invention will become clearer from the following description of preferred exemplary embodiments with reference to the figures. In this regard show:

FIG. 1: Perspective view of an inventive Adjustment device

Figure 2:
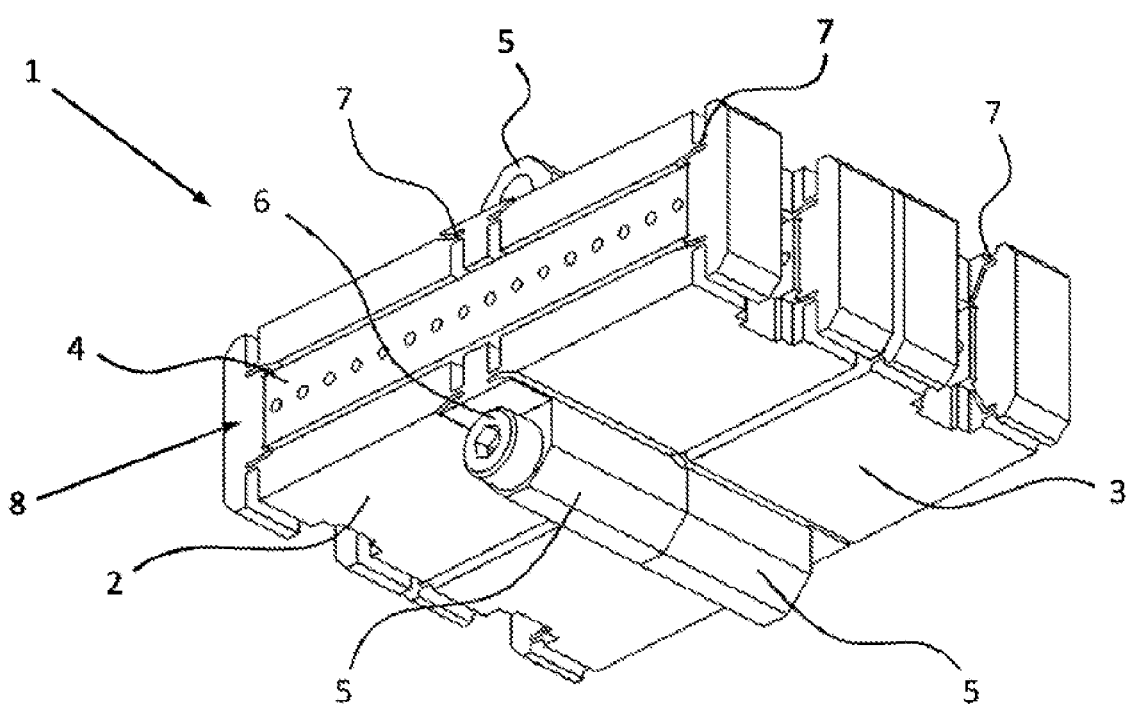

FIG. 2: Another perspective view of the invention Adjustment device according to FIG. 1

Figure 3:
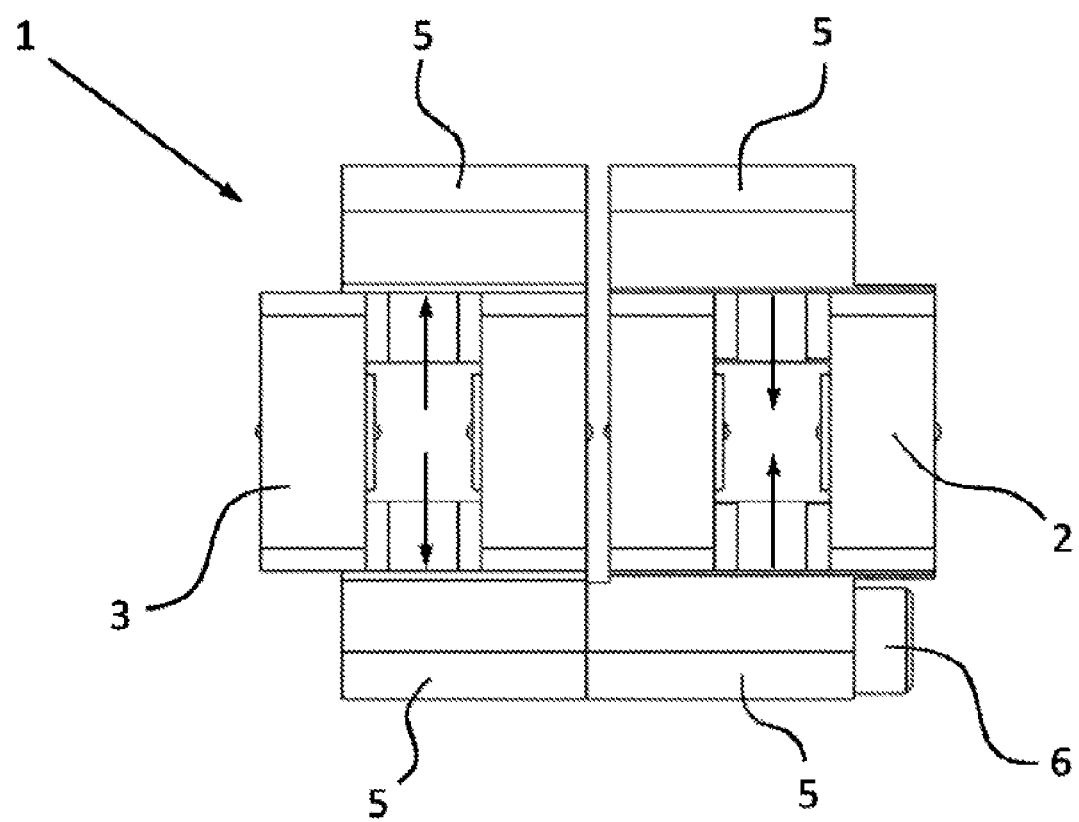

FIG. 3: Side view of the Adjustment device according to the invention according to FIG. 1

Figure 4:
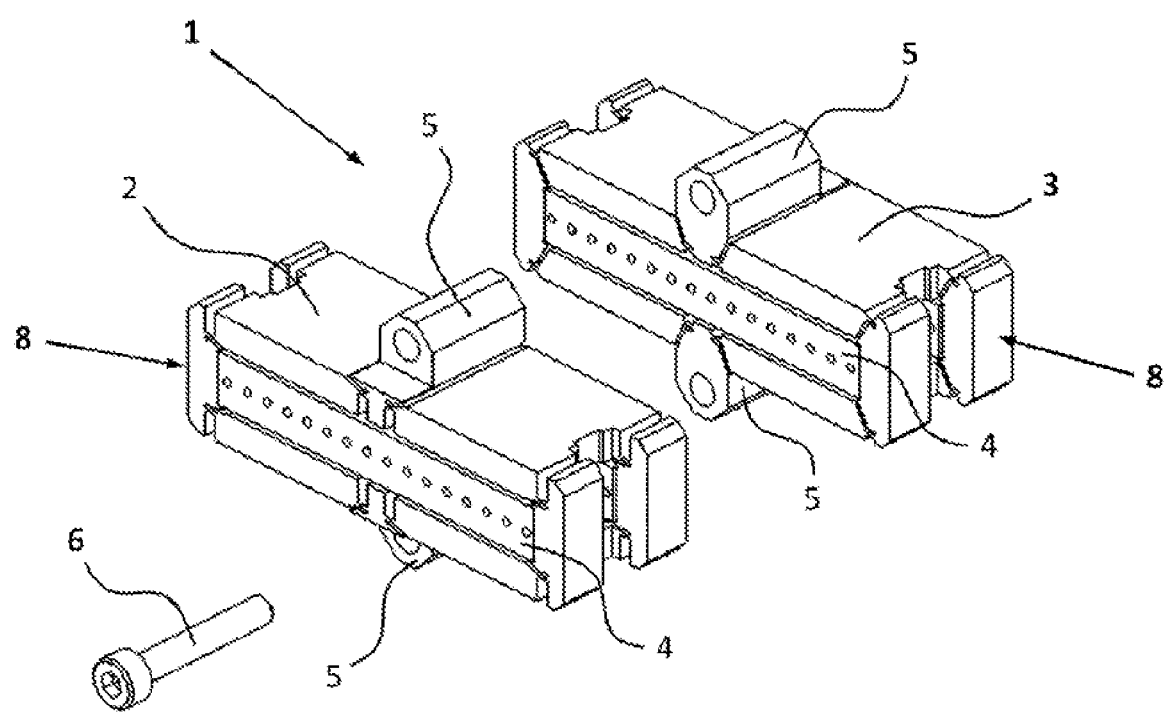

FIG. 4: Exploded view of the Adjustment device according to the invention according to FIG. 1

The adjustment device 1 according to the invention according to FIG. 1 comprises two linear stages 2 and 3 which are arranged directly next to one another and overlapping one another, wherein each linear stage comprises a frame 8 with adjustment elements 4 inserted therein in the form of piezoelectric actuators. Each of the two frames 8 comprises numerous flexure hinges 7 distributed over its circumference and two adjustment sections 5 which are embodied in one piece or integrally with the same. The two adjustment sections 5 of a linear stage 2, 3 are arranged here on sides of the adjustment elements 4 which are lying contrary to each other or on sides of the respective frame 8 which are lying contrary to each other.

The adjustment sections 5, which are at the bottom in FIG. 1, of which only the adjustment section 5 of the linear stage 2 can be seen, are firmly connected to one another via a coupling element 6 in the form of a screw.

Both linear stages 2, 3 comprise a lever transmission device, realized by the individual sections or legs of the frame 8, wherein in each case adjacent sections or legs are connected to one another via flexure hinges 7. Although it cannot be seen in FIG. 1, the construction or structure of the frame 8 of the linear stage 2 differs from that of the frame 8 of the linear stage 3, wherein the individual sections or legs of the frame 8 are essentially identical. The differences lie primarily in the differently realized flexure hinges which ensure that, in case that the lengths of the adjustment elements 4 change in the same direction, the adjustment sections 5 of the two linear stages 2, 3 show movements which are different relative to one another.

FIG. 2 shows the adjustment device 1 according to the invention according to FIG. 1 in a different perspective illustration, so that the underside of the adjustment device, which is largely covered in FIG. 1, can be seen here. In particular, the fixed connection of the two directly adjacent adjustment sections 5 of the linear stages 2 and 3 by means of the coupling element 6 in the form of a screw is illustrated.

FIG. 3 shows a side view of the adjustment device 1 according to the invention according to FIG. 1 or FIG. 2. The arrows shown in FIG. 3 illustrate the different mutual relative movements of the two adjustment sections 5 of the linear stages 2 and 3. While the linear stage 3 on the left in FIG. 3 is configured to ensure movements of its adjustment sections 5 when the adjustment elements 4 are actuated, by which the same move away from each other or by which the distance between the same is enlarged, the linear stage 2 on the right in FIG. 3 is configured to ensure a movement of its adjustment sections 5 when the setting elements 4 are actuated, by which the same move towards each other or by which the distance between the same is reduced or decreased.

In FIG. 3 the upper adjustment section 5 of the left linear stage 3 is provided for a stationary connection with a higher-level unit, not shown in FIG. 3, so that by actuation of the adjustment elements 4 of the linear stage 3 effectively only the lower adjustment section 5 moves, and with a movement directed away from the upper adjustment section 5 of the linear stage 3. The corresponding displacement or resulting displacement of the lower adjustment section 5 of the linear stage 3 corresponds to the increase in the distance between the two adjustment sections 5 which are lying contrary to one another.

Due to the firm connection of the lower adjustment section 5 of the left linear stage 3 in FIG. 3 with the lower adjustment section 5 of the right linear stage 2 in FIG. 3 via the coupling element 6, the above-described movement of the lower adjustment section 5 of the linear stage 3 results in an analogous movement of the adjacent linear stage 2. In other words, the movement of the lower adjustment section 5 of the linear stage 3 is transmitted to the entire linear stage 2 and thus also to the upper adjustment section 5 of the linear stage 2 on the right in FIG. 3.

The upper adjustment section 5 of the linear stage 2 on the right in FIG. 3 is provided for the purpose that an element which is to be moved or is to be adjusted relative to the higher-level unit is arranged on the same. As explained above, this adjustment section 5 is moved or adjusted, on the one hand, via the adjustment movement of the adjacent linear stage 3, and, on the other hand, due to actuation of the adjustment elements 4 of the linear stage 2. As described above, the linear stage 2 is configured for the purpose that by actuation of the adjustment elements 4 a movement of adjustment sections 5 is provided by which the same move towards one another or by which the distance between the same is reduced or decreased. At the same time, the two adjustment movements are arranged by a substantially identical distance in the same direction and thus add up themselves. Overall, the adjustment device according to the invention results in an enlarged displacement with a compact structural dimension.

It is conceivable that the linear stage 2 on the right in FIG. 3 is followed by a further linear stage, this in turn being firmly connected to the upper adjustment section 5 of the linear stage 2, wherein the same via one of its adjustment sections 5 is firmly connected with the upper adjustment section 5 of the linear stage 2. It would thus be possible, while still having compact dimensions, to further enlarge the displacement of the adjustment section on which an element to be adjusted is arranged.

FIG. 4 shows the adjustment device 1 according to the invention in an exploded view. In this illustration, the differences in the construction or the structure of the frames 8 of the linear stages 2 and 3 and their respective flexure hinges 7 can be seen more clearly. Here the frame 8 or the flexure hinges of the same of the linear stage 2 on the left in FIG. 4 is or are configured such that, in case of an enlargement of the length of the adjustment element 4 in form of an piezoelectric actor, the two adjustment sections 5, which lie with regard to the adjustment element 4 on sides which lie contrary to each other, move towards each other. In contrast, the frame 8 or its solid-state joints 7 of the linear adjuster 3 on the right in FIG. 4 is or are configured such that, in case of an increase of the length of the adjusting element 4 in the form of a piezoelectric actuator, the two adjusting sections 5, which are arranged on sides which lie contrary to each other with respect to the adjusting element 4, move away from one another move.

In addition, it is possible for the linear stages comprise an identically constructed frame 8 with identically constructed flexure hinges 7, wherein the different relative movements of the adjustment sections 5 to one another are realized by different directions of length change of the adjustment elements 4, for example by an increase of the length of an adjustment element 4 and by a reduction of the length of another adjustment element 4. It is conceivable that different types of adjustment elements are used for the different linear stages.

LIST OF REFERENCE SYMBOLS 1 adjustment device
2, 3 linear stage
4 adjustment element
5 adjustment section
6 coupling element
7 flexure hinge
8 frame (of the linear stage 2 resp. 3)

The invention claimed is:

1. An adjustment device comprising:
at least two adjacently arranged linear stages, wherein each linear stage comprises at least one adjustment element and two adjustment sections arranged on sides of the adjustment element disposed contrary to each other, so that there are a total of at least four adjustment sections in the adjustment device, and wherein one adjustment section of the at least four adjustment sections is used for a fixed arrangement on a higher-level unit;
wherein an adjustment section is used for an arrangement of an element to be moved by a defined displacement relative to the higher-level unit thereon, and adjacent linear stages in each case are firmly connected to one another via an adjustment section so that an adjusting movement of a linear stage is transferable to a neighboring linear stage;
wherein a linear stage is configured to effect an increase in the distance between the adjustment sections which are arranged on it by actuating the adjustment element, and wherein an adjacent linear stage is configured to effect a decrease in the distance between the adjustment sections which are arranged on it by actuating the adjustment element, so that a displacement of the adjustment device can be realized, which corresponds to the sum of the amount of the distance changes between the adjustment sections of the linear stages; and
wherein at least one of the linear stages comprises a lever transmission device, and the adjustment element comprises an elongated shape and is inserted in a frame of the linear stage which comprises flexure hinges, wherein the adjustment movements of the linear stage take place in substantially the same direction.

2. The adjustment device according to claim 1, wherein the adjustment sections of adjacent linear stages are connected to one another via a coupling element.

3. The adjustment device according to claim 1, wherein the adjustment element is an electromechanical element.

4. The adjustment device of claim 3, wherein the electromechanical element comprises piezoelectric material.

5. The adjustment device according to claim 1, wherein structures of the frames of adjacent linear stages differ from one another.

6. The adjustment device according to claim 5, wherein the two adjustment sections of one linear stage are formed integrally with the frame.

7. The adjustment device according to claim 1, wherein the two adjustment sections of one linear stage are formed integrally with the frame.

8. The adjustment device according to claim 1, wherein a direction of adjustment movement of an adjustment section is disposed essentially perpendicular to a direction of extension of the adjustment element.

9. A positioning device for optical elements with an adjustment device according to claim 1.

* * * * *